(12) United States Patent
Mizushima et al.

(10) Patent No.: US 7,650,503 B2
(45) Date of Patent: Jan. 19, 2010

(54) MEMORY CARD

(75) Inventors: Nagamasa Mizushima, Fujisawa (JP);
Motoyasu Tsunoda, Sagamihara (JP);
Kunihiro Katayama, Chigasaki (JP)

(73) Assignee: Renesas Technology Corp., Tokyo (JP)

( * ) Notice: Subject to any disclaimer, the term of this patent is extended or adjusted under 35 U.S.C. 154(b) by 239 days.

(21) Appl. No.: 11/984,010

(22) Filed: Nov. 13, 2007

(65) Prior Publication Data

US 2008/0082825 A1   Apr. 3, 2008

Related U.S. Application Data

(63) Continuation of application No. 10/636,666, filed on Aug. 8, 2003, now abandoned.

(30) Foreign Application Priority Data

Sep. 11, 2002   (JP) ............................. 2002-264893

(51) Int. Cl.
*H04L 9/32* (2006.01)
(52) U.S. Cl. ................... 713/172; 713/176; 713/194
(58) Field of Classification Search .................. None
See application file for complete search history.

(56) References Cited

U.S. PATENT DOCUMENTS

| | | | | |
|---|---|---|---|---|
| 5,293,424 A | | 3/1994 | Holtey et al. ................. | 713/193 |
| 5,359,569 A | | 10/1994 | Fujita et al. .................. | 365/229 |
| 5,623,637 A | * | 4/1997 | Jones et al. ................... | 711/164 |
| 6,243,812 B1 | | 6/2001 | Matyas et al. ................ | 713/172 |
| 6,606,707 B1 | | 8/2003 | Hirota et al. ................. | 713/172 |
| 6,782,477 B2 | | 8/2004 | McCarroll ................... | 713/189 |
| 6,810,479 B1 | * | 10/2004 | Barlow et al. ................ | 713/185 |

FOREIGN PATENT DOCUMENTS

| | | |
|---|---|---|
| JP | 2000-242750 | 9/2000 |
| JP | 2000-338868 | 12/2000 |
| JP | 2001-357365 | 12/2001 |
| JP | 2002-024773 | 1/2002 |

* cited by examiner

*Primary Examiner*—Brandon S Hoffman
(74) *Attorney, Agent, or Firm*—Mattingly & Malur, PC

(57) ABSTRACT

A memory card has: a flash memory chip for storing digital certificates and a seed of random numbers; a controller chip which can execute a managing process for managing the digital certificates and a random number generating process for generating the pseudo random numbers by using the seed of random numbers; and an IC card chip which can execute an authenticating process for authenticating personal identification information (PIN) inputted from a host apparatus and an encrypting process for encrypting the seed of random numbers. Thus, a processing time of security processes is reduced while assuring safety of the security processes.

9 Claims, 6 Drawing Sheets

MEMORY CARD

This is a continuation application of U.S. application Ser. No. 10/636,666, filed on Aug. 8, 2003, now abandoned the contents of which are incorporated herein by reference.

BACKGROUND OF THE INVENTION

The invention relates to a storage device having a security function, a host apparatus into which the storage device can be inserted, and the host apparatus having the storage device. More particularly, the invention relates to a memory card having a flash memory chip and a controller, an information processing apparatus into which the memory card can be inserted, and the information processing apparatus having the memory card.

An IC card is constructed by embedding an IC (Integrated Circuit) chip into a plastic card substrate and has external terminals of the IC chip on its surface. As external terminals of the IC chip, there are a power terminal, a clock terminal, data input/output terminals, and the like. A connected apparatus directly supplies a power source and a drive clock to the IC chip from the external terminals, thereby making the IC chip operative. The IC card exchanges information with the connected apparatus such as a terminal device or the like by transmitting and receiving an electric signal to/from the connected apparatus via the external terminals. As a result of the information exchange, the IC card sends a calculation result and stored information and changes the stored information. On the basis of specifications of those operations, the IC card can have a function for executing a security process such as protection of secret data, personal identification, and the like. The IC card is used as a user device for the personal identification in a system in which security of secret information in a credit settlement, banking, or the like is necessary.

JP-A-2000-242750 discloses a personal identification system comprising: a personal digital assistant which has tamper-resistant and in which registration information has been stored; and a personal identification apparatus which has the tamper-resistant and can make personal identification on the basis of the registration information in the personal digital assistant and input information which is newly inputted when communication with the personal digital assistant can be made, wherein encrypting means for encrypting the registration information and sending an obtained cipher text to the personal identification apparatus when the personal identification is made is provided as a personal digital assistant, and decrypting means for obtaining the registration information by decrypting the cipher text sent from the encrypting means and collating means for collating the registration information obtained by the decrypting means with the input information are provided as a personal identification apparatus.

JP-A-2000-338868 discloses a first issuing method of the public key certificates such that: among a plurality of basic information for public key certificates formed on the basis of predetermined applying information, signature data for the one format is formed with respect to the basic information for the one format as a target; a public key certificate for another format is formed by including signature data for another format with respect to the formed basic information and signature data and the basic information for that another format as targets; the basic information for the one format, the signature data for the one format, the basic information for that another format, and the signature data for that another format are obtained from the formed public key certificates; and a public key certificate for the one format is formed on the basis of the obtained basic information and signature data. JP-A-2000-338868 also discloses a second issuing method of the public key certificates such that: signature data is formed with respect to a coupling hash value, as a target, in which basic information of a plurality of formats for public key certificates formed on the basis of predetermined applying information are arranged in predetermined order and hash values of the basic information are coupled; and a public key certificate is formed by including the basic information corresponding to a format which can be used on an applicant side, the hash values formed from the basic information of formats other than the format of the basic information, and the formed signature data.

JP-A-2001-357365 discloses a data storage device comprising: input/output control means for controlling an input and an output of data to/from an information processing apparatus; first storage control means for controlling storage of the data corresponding to a plurality of services; and second storage control means for controlling storage of a first service ID corresponding to a first service among the plurality of services and a second service ID corresponding to a second service, among the plurality of services, in which the input/output of the data are permitted in the case where the input/output of the data regarding the first service are controlled by the input/output control means.

JP-A-2002-024773 discloses an IC card service addition permitting apparatus comprising: service addition information storing means for holding service addition information regarding an IC card; and service addition permitting means for receiving service addition request data to the IC card and encrypted IC card issuer data recorded in the IC card, authenticating the encrypted IC card issuer data by key information given in order to confirm an issuer of the IC card, sending service addition permission data when the issuer of the IC card is confirmed, writing information regarding the permitted service addition to the service addition information storing means, and sending service addition inhibition data when the issuer of the IC card is not confirmed.

According to the conventional techniques, since all security processes are executed by the IC card chip, a processing time is long. That is, since processing ability of a CPU of the IC card chip is lower than that of a CPU of a controller of a memory card, processes which are executed by software among the security processes take time. In the case of executing all of the security processes by the controller of the memory card, since tamper-resistant of the controller of the memory card is lower than that of the IC card chip, the controller is easily subjected to attack from the outside, and safety of the security processes cannot be assured.

SUMMARY OF THE INVENTION

It is an object of the invention to provide a storage device in which a processing time of security processes is reduced while assuring safety of the security processes.

According to the invention, among a series of security processes, a controller in a memory card executes a managing process for managing digital certificates and a random number generating process for generating pseudo random numbers by using a seed of random numbers, and an IC card chip in the memory card executes an authenticating process for authenticating personal identification number (PIN) inputted from a host apparatus and an encrypting process for encrypting the seed of the random numbers by using a key corresponding to a key held in a server.

The series of security processes denotes, for example, processes such that in the case where the host apparatus having the memory card and the server exchange information or the host apparatus reproduces information, hacking or alteration which is made by the third party without browsing/using authorization of the information is prevented by using an encrypting technique or the like.

According to the invention, there is an effect such that the processing time of the security processes is reduced while assuring safety of the security processes of the storage device.

Other objects, features and advantages of the invention will become apparent from the following description of the embodiments of the invention taken in conjunction with the accompanying drawings.

DESCRIPTION OF THE EMBODIMENTS

An embodiment of the invention will be described hereinbelow.

Figure 1:
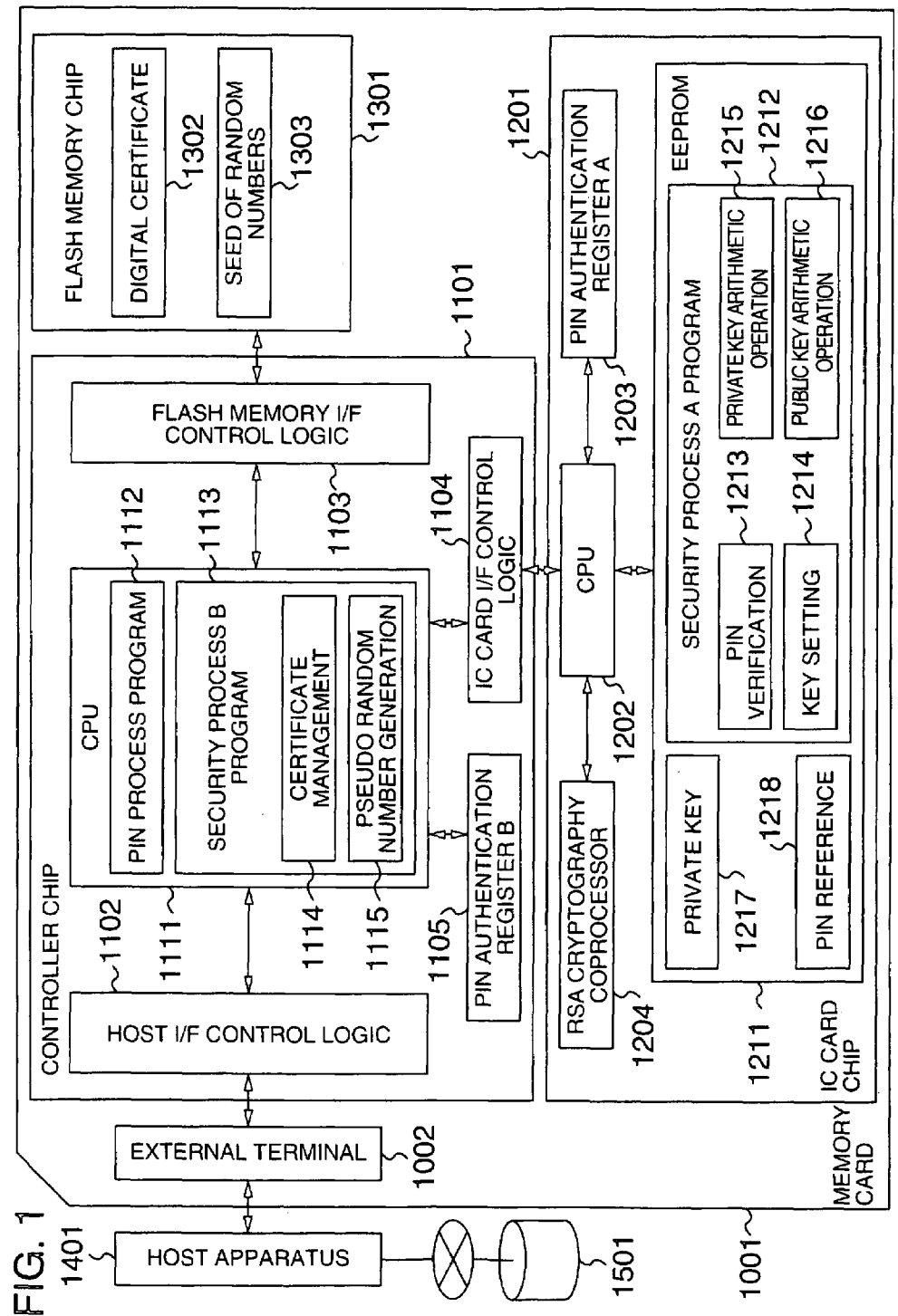
FIG. 1 is a diagram showing an internal construction of a memory card to which the invention is applied.

FIG. 1 simply shows an internal constructional diagram of a memory card to which the invention is applied. It is preferable that a memory card 1001 conforms with the MultiMediaCard specifications. MultiMediaCard is a registered trademark of Infineon Technologies AG. The memory card 1001 has a function for executing two kinds of processes: a storage process for reading or writing file data which is used by a host apparatus when an external terminal 1002 connected to an outside issues a memory card command; and a security process such as a cryptographic operation or the like which is necessary for secret data protection, user authentication, or the like. The secret data denotes a private key, a digital certificate, and the like which are peculiar to the owner of the memory card 1001. The user authentication denotes a function such that before the owner is permitted to use those secret data, the memory card 1001 itself discriminates whether the person who accesses is the owner himself of the memory card 1001 or not. A user authentication system which is used in the embodiment is a system whereby personal identification information (hereinafter, abbreviated to PIN) such as personal identification number, biometrics information, or the like which the owner individually memorizes is inputted to the memory card 1001 via a host apparatus 1401 and whether it coincides with reference data (hereinafter, referred to as a reference PIN) in the memory card 1001 or not, thereby specifying that he is the true owner.

The memory card 1001 has: an external terminal 1002 for connecting to the host apparatus 1401; a controller chip 1101 for controlling the writing of file data into a flash memory chip 1301, the reading of the file data from the flash memory chip 1301, and the erasure of the file data in the flash memory chip 1301; the flash memory chip 1301 which can store data; and an IC card chip 1201 for encrypting or decrypting the data by using a public key or a private key. The memory card 1001 receives a standard memory card command (command for accessing the flash memory chip 1301) and a secure command for executing the security processes via a single external interface. The controller chip 1101 has a function for selecting the chip (either the flash memory chip 1301 or the IC card chip 1201) to be accessed in accordance with whether the command received by the memory card 1001 is the standard memory card command or the secure command and, further, in the case of the secure command, in accordance with contents of the requested security process and distributing command processes. When the controller chip 1101 receives the standard memory card command, it selects the flash memory chip 1301, issues a flash memory command to it, and reads or writes data for the host apparatus. When the controller chip 1101 receives the secure command, it discriminates whether the security process instructed by the command should be executed by the IC card chip 1201 or not. If the security process is a process which should be executed by the IC card chip 1201, the controller chip 1101 selects the IC card chip 1201, issues an IC card command, and executes the desired security process. If the security process is not the process which should be executed by the IC card chip 1201, the security process is executed in the controller chip 1101.

The host apparatus 1401 corresponds to, for example, a cellular phone, a PDA (Personal Digital Assistant), a personal computer, a music player, a camera, a video camera, an automatic teller machine, a kiosk, a settlement terminal, or the like.

The flash memory chip 1301 is a memory chip using a non-volatile semiconductor memory as a storing medium and can read and write file data by a flash memory command which is transmitted from the controller chip 1101. The flash memory chip 1301 stores digital certificate 1302 which is used for the security process that is executed in the controller chip 1101 and a seed 1303 of random numbers serving as an origin of generation of the random numbers.

The external terminal 1002 is constructed by a plurality of terminals and includes a power supply terminal, a clock input terminal, a command input/output terminal, a data input/output terminal, and a ground terminal in order to exchange information with the external host apparatus 1401.

The IC card chip 1201 is a microcomputer chip to be embedded into a plastic substrate of the IC card. Its external terminal, electric signal protocol, and commands conform with the ISO/IEC7816 standard. As external terminals of the IC card chip 1201, there are a power supply terminal, a clock input terminal, a reset input terminal, an I/O (input/output) terminal, and a ground terminal. The controller chip 1101 issues an IC card command (command which can be interpreted by the IC card chip 1201) to the IC card chip 1201 from the external terminal of the IC card chip 1201, so that it can execute arithmetic operations necessary for the security processes.

The controller chip 1101 is connected to other component elements (the external terminal 1002, the flash memory chip 1301, the IC card chip 1201) in the memory card 1001 and is a microcomputer chip which plays a main role for controlling them. A CPU 1111 provided in the controller chip 1101 controls all other elements constructing the controller chip 1101 in accordance with a program built therein. A host interface control logic 1102 is a logic circuit for executing an electric signal protocol when the CPU 1111 in the memory card 1001 receives the memory card command from the external host apparatus 1401 or transmits a memory card response to the received command to the external host apparatus 1401.

A flash memory interface control logic 1103 is a logic circuit for executing an electric signal protocol when the CPU 1111 sends the flash memory command for transferring the file data being read or to be written between the CPU 1111 and the flash memory chip 1301 or when the CPU 1111 receives a response to such a command. An IC card interface control logic 1104 is a logic circuit for executing an electric signal protocol when the IC card command is transmitted between the CPU 1111 and the IC card chip 1201 or when the CPU 1111 receives a response to such a command. The CPU 1111 includes not only a program for controlling the above three kinds of control logics 1102, 1103, and 1104 but also the programs 1112 and 1113 for executing the foregoing security processes. The PIN process program 1112 describes processes which are executed in the controller chip 1101 upon user authentication. The security process B program 1113 describes other security processes which are executed in the controller chip 1101. As specific contents of them, certificate management 1114 and random number generation 1115 are included. In those processes, the digital certificate 1302 and the seed 1303 of random numbers which have been stored in the flash memory chip 1301 are used, respectively. Further, the controller chip 1101 includes a PIN authentication register B 1105 for temporarily holding a state of the user authentication. The words "temporarily holding" denote that when a power source is supplied, the data can be held and when the power supply is stopped, the held data is extinguished (abandoned).

The IC card chip 1201 comprises: a CPU 1202 for executing an arithmetic operating process; a PIN authentication register A 1203 for temporarily holding the state of the user authentication; an EEPROM (Electrically Erasable Programmable Read Only Memory) 1211 as a non-volatile memory; and a cryptography coprocessor 1204 for executing a process regarding RSA cryptography as a kind of asymmetric cryptography. By using the cryptography coprocessor 1204, the IC card chip 1201 executes the security processes based on the RSA cryptography. The security processes denote, for example, creation and verification of a digital signature and cryptography and decryption of secret data. The IC card chip 1201 can also execute the security processes by using not only the cryptography coprocessor 1204 (hardware) but also a program (software) in the CPU 1202. It is assumed that program processing performance of the CPU 1202 is lower than that of the CPU 1111 (however, the memory card to which the invention is applied can be a card in which the program processing performance is not lower). The EEPROM 1211 stores data and programs which are used for the security processes which are executed in the CPU 1202 or by the cryptography coprocessor 1204. Specifically speaking, the EEPROM 1211 stores a private key 1217 for the RSA cryptography, a PIN reference 1218 for the user authentication, and a security process A program 1212 describing the security processes which are executed in the IC card chip. As contents of the security process A program 1212, PIN verification 1213 for the user authentication, key setting 1214 for RSA cryptography calculation, a private key arithmetic operation 1215 by the RSA cryptography, and a public key arithmetic operation 1216 by the RSA cryptography are included. The RSA cryptography coprocessor 1204 is used for execution of remainder multiplication which is necessary in the processes of the arithmetic operations 1215 and 1216.

A memory capacity of the EEPROM 1211 of the IC card chip 1201 is smaller than that of the flash memory chip 1301. However, when the invention is applied, the memory capacity of the EEPROM 1211 of the IC card chip 1201 can be also equal to or larger than that of the flash memory chip 1301.

A product which has already been authenticated by the Evaluation/Authentication Office of ISO/IEC15408 as an international standard of the security evaluation reference is used as an IC card chip 1201. Generally, when an IC card having a function for executing the security processes is used for actual electronic fund transfer service or the like, the IC card needs to be subjected to the evaluation and authorization by the Evaluation/Authentication Office of ISO/IEC15408. It is preferable that the memory card 1001 has therein the IC card chip 1201 which has already been authenticated by the Evaluation/Authentication Office. The memory card 1001 has a structure in which a part of the security processes can be executed by using this IC card chip 1201. The controller chip 1101 does not always need to be subjected to the evaluation and the authorization mentioned above. By using the IC card chip 1201, the memory card 1001 obtains the function for executing the security processes which need to assure intensity higher than that of the security which can be assured in the security processes which are executed in the controller chip 1101.

The power supply terminal, clock input terminal, reset input terminal, and I/O (input/output) terminal of the external terminals of the IC card chip 1201 are connected to the controller chip 1101.

The controller chip 1101 controls a power supply and a clock supply to the IC card chip 1201 via the power supply terminal and the clock input terminal. In order to set the IC card chip 1201 to which no power source is supplied into a mode where it can receive the IC card command, first, the power supply to the IC card chip 1201 is started and a resetting process (including the start of the clock supply) based on the ISO/IEC7816-3 standard is executed. For example, when the memory card 1001 receives the command for executing the security processes from the host apparatus 1401, the controller chip 1101 can start the power supply to the IC card chip 1201 via the power supply terminal by using such reception timing as a trigger. Or, even if no security process is executed, the power supply to the IC card chip 1201 is maintained and, when the memory card 1001 receives the command for executing the security processes from the host apparatus 1401, the controller chip 1101 can execute the resetting process of the IC card chip 1201 via the reset input terminal by using such reception timing as a trigger. It is desirable that as for the memory card 1001, the clock signal which is supplied to the IC card chip 1201 via the clock input terminal of the IC card chip 1201 is generated in the controller chip 1101 independently of the clock input signal from the outside of the card and a frequency, supply start timing, and supply stop timing of the clock signal are controlled.

Subsequently, contents of the security processes which are executed in the memory card 1001 in FIG. 1 to which the invention is applied will be described. The memory card 1001 mainly executes the following four kinds of security processes. (1) PIN verification for the user authentication. (2) Reading/updating of the digital certificate. (3) Generation of pseudo random numbers. (4) Arithmetic operations by the RSA cryptography system. Among them, the execution of the processes (2) to (4) is permitted only after the user is correctly authenticated by the process (1). However, when the power supply to the memory card 1001 is stopped, it is assumed that the authentication result by the process (1) is abandoned (the system enters a state where the user is not authenticated). To execute the processes (2) to (4) after the power supply is restarted, first, the user needs to be again correctly authenticated by the process (1). An example of the system to which the security processes are applied will be described hereinbelow. The host apparatus 1401 having the function of connecting to the network and the user who operates it make secured data communication (for example, download of personal information) which does not permit wiretapping or impersonation with a remote server 1501 on the network by using the security processes. First, the verification or the like of the digital certificate is made by the process (4) on the basis of the user authentication by the process (1) and mutual authentication is executed between the server 1501 and the host apparatus 1401. Thus, both of them can share the secret data. It is a seed for generation of the pseudo random numbers. Subsequently, the controller chip 1101 generates the pseudo random numbers from such a seed by the process (3) and encrypts or decrypts information to be exchanged between the server 1501 and the host apparatus 1401 by those random numbers. Both of them transmit the encrypted information via the network. For example, the host apparatus 1401 encrypts the information which is transmitted to the server 1501 by using the pseudo random numbers or decrypts the information received from the server 1501. The controller chip 1101 can also generate the pseudo random numbers in (3) in response to the command from the host apparatus 1401 each time the host apparatus 1401 and the server 1501 establish a communication session (that is, the pseudo random numbers are valid only for a period of time from the establishment of the communication session to its disconnection). Only the server 1501 and the host apparatus 1401 having the random number seed 1303 can decrypt the cipher. The communication data can be securely exchanged by the above method. A digital certificate of the user himself, a digital certificate of the host apparatus 1401, a digital certificate of a communication partner (server 1501) of the host apparatus 1401, a certificate of a certificate authority which issued them, and the like can be managed in the memory card 1001 by the process (2). When the host apparatus 1401 downloads file data from the server 1501, the host apparatus 1401 transmits the digital certificates to the server 1501. The server 1501 verifies validity of the host apparatus 1401 by using the digital certificates sent from the host apparatus 1401. If it is determined as a result of the verification that the host apparatus 1401 is valid, the host apparatus 1401 permits the download of the file data. If it is determined that the host apparatus 1401 is invalid, the host apparatus 1401 refuses the download of the file data. It is preferable that the digital certificate of the user himself is used for settlement or the like. It is preferable that the digital certificate of the host apparatus 1401 is used for the host apparatus 1401 to obtain the information from the server 1501.

The processes of (2) and (3) among the four kinds of security processes which are executed by the memory card 1001 are executed in the controller chip 1101 and the processes of (1) and (4) are executed in the IC card chip 1201. That is, since tamper-resistant of the IC card chip 1201 is higher than that of the controller chip 1101, that is, the IC card chip 1201 is stronger against an attack from the outside, it is more safe if the PIN reference 1218 is held by the IC card chip 1201. All of the four kinds of processes can be also executed in the IC card chip 1201 in consideration of a purpose for assuring higher security intensity. The above distributing method has the following two advantages from a viewpoint of improvement of a convenience for the user. First, the number of digital certificates (indicating 1302 stored in the flash memory chip 1301) which can be handled by the process of (2) can be set to be larger than the number of digital certificates which can be stored in the EEPROM 1211 of the IC card chip 1201. Second, a processing time which is required for execution of (3) can be set to be shorter than that in the case where it is executed by the IC card chip 1201 (in dependence on a difference of performance of the CPU). That is, since processing ability of the CPU 1111 of the controller chip 1101 is higher (its processing speed is higher) than that of the CPU 1202 of the IC card chip 1201, as a speed of the processes to be executed by software, the speed of the processes executed by the controller chip 1101 is higher. On the other hand, since a processing speed of the cryptography or decryption which is executed by the cryptography coprocessor 1204 as hardware is higher than that of the cryptography or decryption which is executed by the software, a processing speed of the cryptography or decryption which is executed by the IC card chip 1201 is higher. Since the discrimination about the permission of the execution of the processes (2) and (3) is made on the basis of a processing result of (1), a mechanism for correctly transferring the processing result of (1) in the IC card chip 1201 to the controller chip 1101 is needed. As will be explained hereinlater, such a problem is solved by applying the invention.

Figure 2:
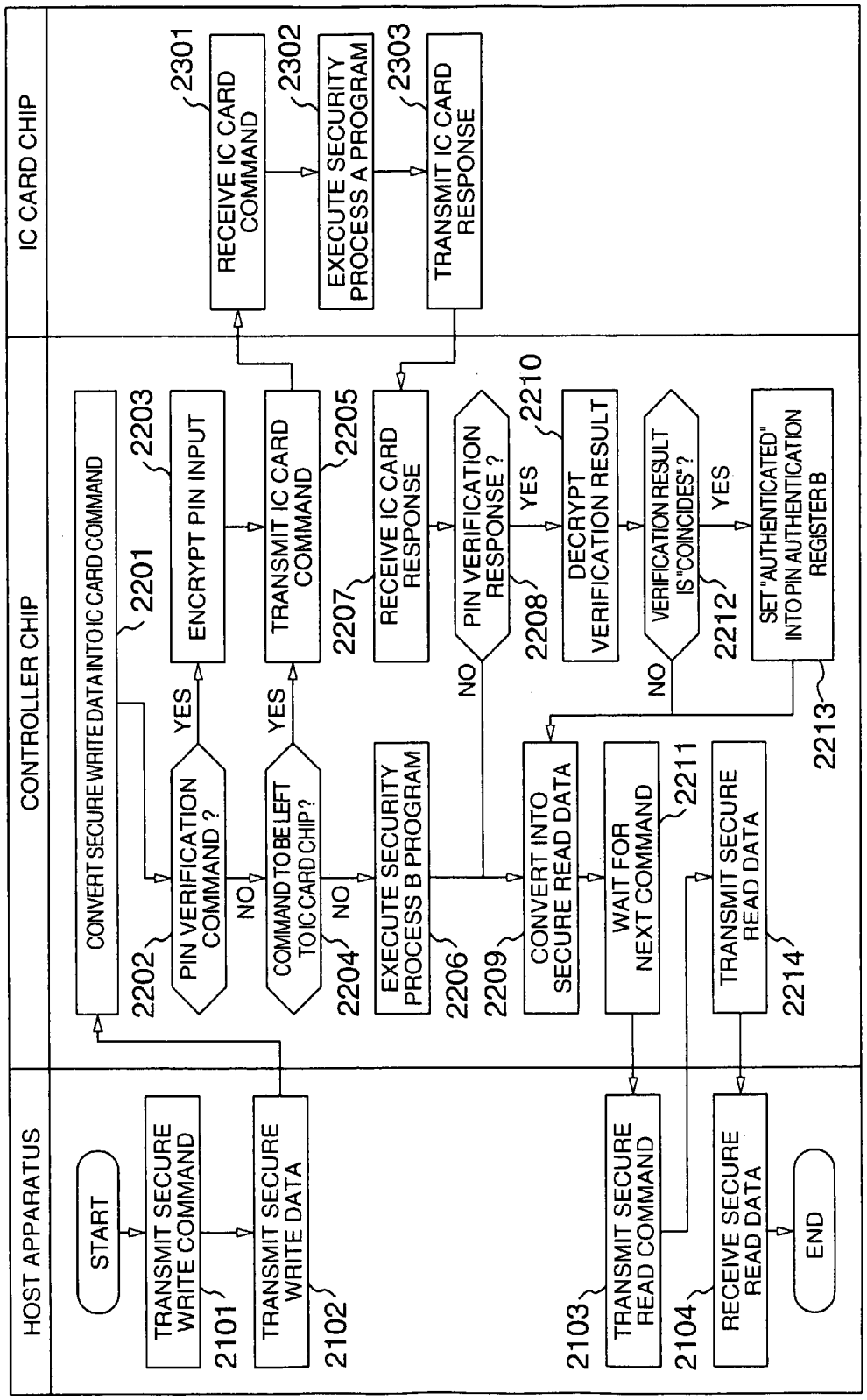
FIG. 2 is a flowchart showing an executing process of security processes by the memory card to which the invention is applied.

FIG. 2 is a flowchart showing detailed processes at the time of allowing the memory card 1001 in FIG. 1 to which the invention is applied to execute the security processes. To execute the security processes, there are two kinds of commands as secure commands mentioned above: the first is a secure write command; and the second is a secure read command. The secure write command is a command for transmitting data including contents of the security processes which are required by the host apparatus 1401 (hereinafter, such data is referred to as secure write data) to the memory card 1001. The secure read command is a command for allowing the host apparatus 1401 to read out data including results of the security processes (hereinafter, such data is referred to as secure read data). The host apparatus 1401 issues those two kinds of commands and allows the memory card 1001 to execute the security processes. Although the security processes include a plurality of processes, one of them can be executed by issuing one set of the secure write command and the secure read command.

An executing procedure for the security processes will be described in detail with reference to a flowchart of FIG. 2. First, the host apparatus 1401 transmits the secure write command to the memory card 1001 (2101) and, subsequently, transmits the secure write data including contents of the requested security process (2102). The controller chip 1101 converts the secure write data into an IC card command (2201). Whether the IC card command is a command for verifying a PIN input or not is discriminated (2202). If it is the PIN verification, a PIN input portion in the IC card command is replaced with the portion obtained by encrypting the original PIN input by the PIN process program 1112 (2203). The processing routine advances to step 2205. A secret key which has previously been shared between the controller chip 1101 and the IC card chip 1201 (hereinafter, such a key is referred to as a chip common key) is used as a key for encrypting the PIN input. Thus, the PIN input which is transferred between the two chips can be protected against the illegal alteration. The chip common key has been described in the PIN process program 1112. If the IC card command is not the PIN verification command in step 2202, whether the IC card command is a command which should be executed in the IC card chip or not is discriminated (2204). If it should be executed in the IC card, step 2205 follows. If NO, step 2206 follows. In step 2205, the IC card command is transmitted to the IC card chip 1201 and step 2301 follows. In step 2206, the security process B program 1113 is executed on the basis of the IC card command. Details in the program 1113 will be described hereinlater with reference to FIG. 3. A processing result is converted into secure read data (2209). The IC card chip 1201 receives the IC card command in step 2301 and executes the security process A program 1212 on the basis of the IC card command (2302). Details in the program 1212 will be described hereinlater with reference to FIG. 4. A processing result is transmitted as an IC card response to the controller chip 1101 (2303). The controller chip 1101 receives the IC card response (2207) and discriminates whether the IC card response is a response to the PIN verification command or not (2208). If it is not the response to the PIN verification, step 2209 follows and a processing result is converted into the secure read data. If it is the response to the PIN verification, step 2210 follows. A data portion showing the verification result in the response to the PIN verification has been encrypted by the chip common key in the IC card chip 1201. In step 2210, the controller chip 1101 decrypts the encrypted verification result by the chip common key by the PIN process program 1112, thereby reconstructing the verification result. By this means, the PIN verification result which is transferred between the two chips can be protected against the illegal alteration in a manner similar to that mentioned above. Subsequently, the controller chip 1101 discriminates whether the PIN verification result is data showing "coincides with the PIN reference" or data showing "does not coincide with the PIN reference" (2212). If it is the data showing "coincides with the PIN reference", data showing "authenticated" is set into the PIN authentication register B 1105 in the controller chip 1101 (2213) and step 2209 follows. Since an object of the PIN authentication register B 1105 is to temporarily hold the data, it is desirable to install it by a volatile RAM (Random Access Memory) and it is desirable that the contents in the PIN authentication register B 1105 cannot be freely rewritten from the outside of the memory card 1001. On the other hand, if the PIN verification result is the data showing "does not coincide with the PIN reference", the data showing "authenticated" is not set into the PIN authentication register B 1105 but step 2209 follows. After step 2209, the memory card 1001 enters a mode to wait for the next command by the host apparatus 1401 (2211). When the secure read command is transmitted to the memory card 1001 by the host apparatus 1401 (2103), the memory card 1001 transmits the secure read data obtained in step 2209 (2214). The host apparatus 1401 receives it (2104). In this manner, the execution of one of the security processes is completed.

Figure 3:
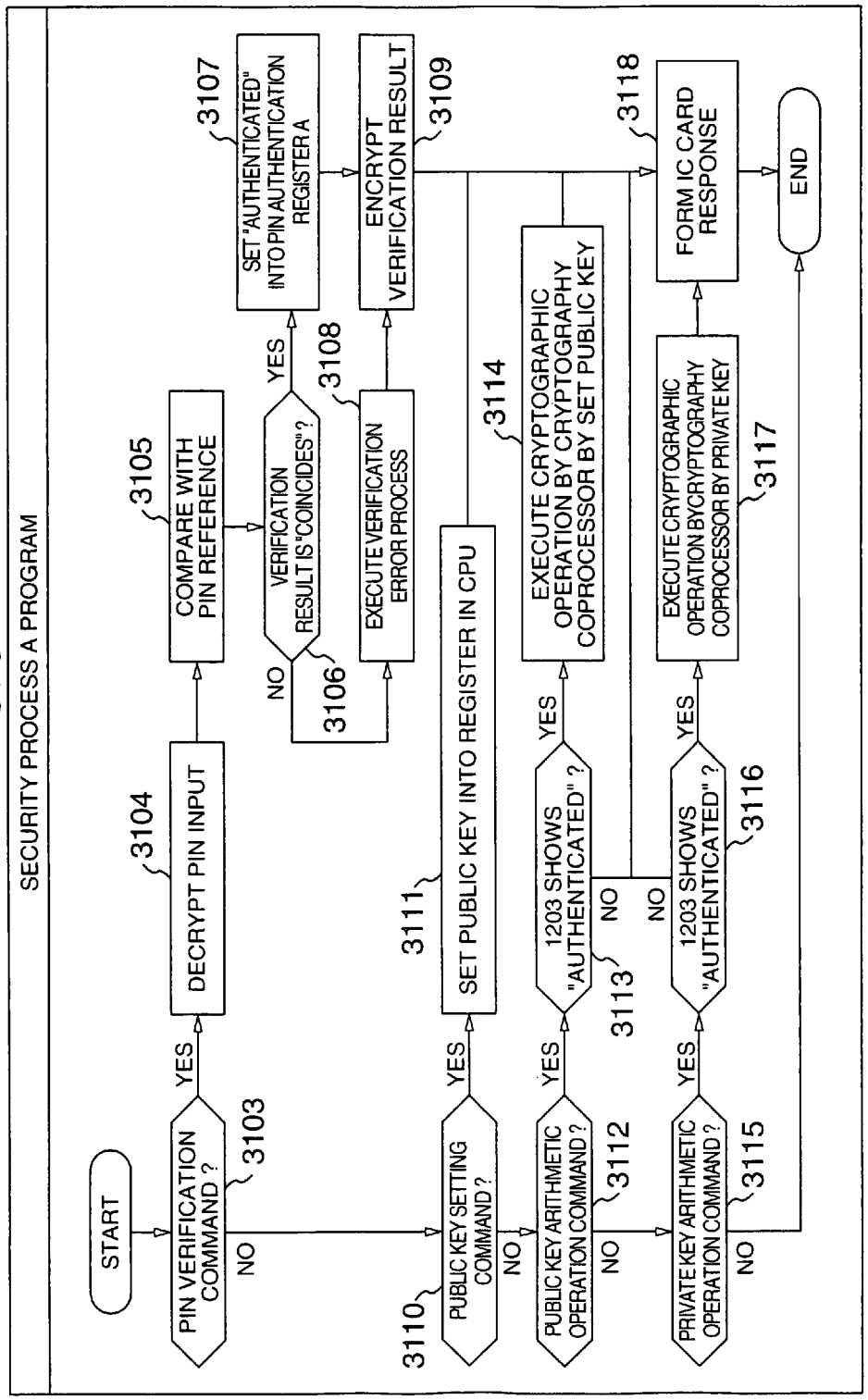
FIG. 3 is a flowchart for a security process program which is executed by an IC card chip in the flowchart shown in FIG. 2.

FIG. 3 shows a detailed processing flow for the security process A program 1212 in the IC card chip 1201 in step 2302 in FIG. 2. As a first step of the security process A program 1212, whether the IC card command is the PIN verification command or not is discriminated (3103). If YES, the PIN input (which has been encrypted by the PIN process program 1112) inputted by this command is decrypted by the foregoing chip common key (3104) and its value is compared with the value of the PIN reference 1218 (3105). Whether a comparison result indicates "coincides" or "does not coincide" is discriminated (3106). If it is "coincides", "authenticated" is set into the PIN authentication register A 1203 (3107) and step 3109 follows. Since an object of the PIN authentication register A 1203 is to temporarily hold the data, it is desirable to install it by a volatile RAM in a manner similar to the PIN authentication register B 1105 and it is desirable that the contents in the PIN authentication register A 1203 cannot be freely rewritten from the outside of the IC card chip 1201. If the verification result is "does not coincide", a verification error process is executed (3108) and step 3109 follows. The verification error process denotes a process for counting the number of times of accumulation of the discrimination result indicative of "does not coincide", or the like. For example, if the number of times of accumulation exceeds a predetermined number, use of the present security process is perfectly stopped, thereby improving the safety from illegal use. The PIN verification result is encrypted by the chip common key in step 3109. The processing routine advances to step 3118 and an IC card response including the encrypted PIN verification result is formed. If the IC card command is not the PIN verification command in step 3103, whether it is a public key setting command (command for presetting a key which is used for a public key arithmetic operation by the RSA cryptography system) or not is discriminated (3110). If YES, the public key inputted with the public key setting command from the host apparatus 1401 is set into a register (RAM is desirable) in the CPU 1202 (3111). Step 3118 follows and an IC card response including information showing whether the public key has successfully been set or not is formed. If the IC card command is not the public key setting command in step 3110, whether it is the public key arithmetic operation command by the RSA cryptography system or not is discriminated (3112). If YES, whether "authenticated" has been set in the PIN authentication register A 1203 or not is discriminated (3113). If "authenticated" has been set, the RSA cryptography arithmetic operation is executed to the inputted data by the cryptography coprocessor 1204 by using the public key set by the public key setting command (3114). If "authenticated" is not set, step 3114 is not executed. The processing routine advances to step 3118 and an IC card response including the output data by the public key arithmetic operation or the information showing whether the arithmetic operation has successfully been executed or not is formed. If the IC card command is not the public key arithmetic operation command in step 3112, whether it is a private key arithmetic operation command by the RSA cryptography system or not is discriminated (3115). If YES, whether "authenticated" has been set in the PIN authentication register A 1203 or not is discriminated (3116). If "authenticated" has been set, the RSA cryptography arithmetic operation is executed to the inputted data by the cryptography coprocessor 1204 by using the private key 1217 (3117). If "authenticated" is not set, step 3117 is not executed. The processing routine advances to step 3118 and an IC card response including the output data by the private key arithmetic operation or the information showing whether the arithmetic operation has successfully been executed or not is formed. If the IC card command is not the private key arithmetic operation command in step 3115, step 3118 follows and an IC card response including information showing that the command could not be interpreted is formed. In this manner, the security process A program 1212 is completed. One of the input data to be subjected to the cryptographic operation in step 3114 is seed data for generating the pseudo random numbers mentioned above and has been stored as random number seed 1303 in the flash memory chip 1301.

Figure 4:
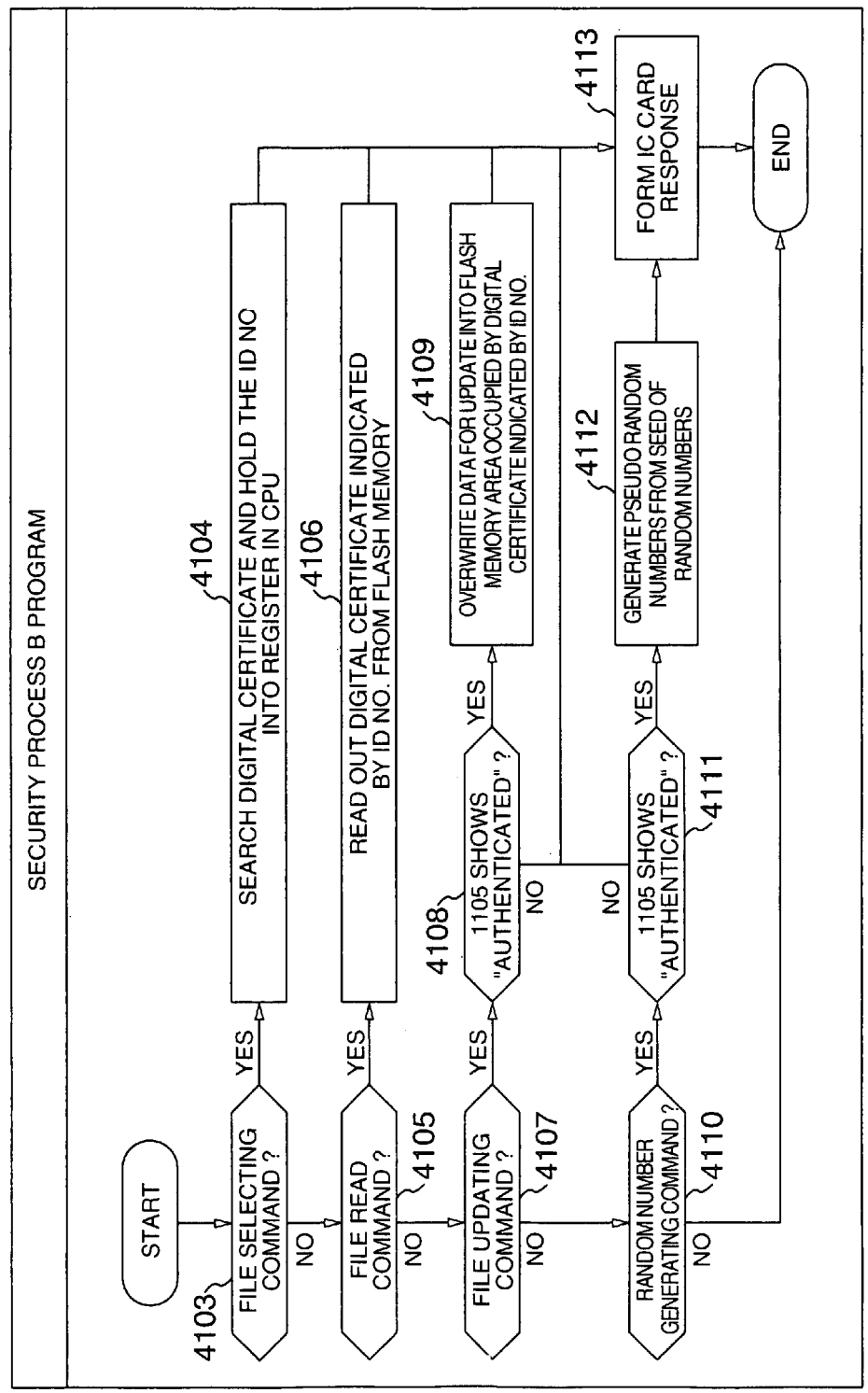
FIG. 4 is a flowchart for a security process program which is executed by a controller chip in the flowchart shown in FIG. 2.

FIG. 4 is a detailed processing flow for the security process B program 1113 in the controller chip 1101 in step 2206 in FIG. 2. As a first step of the security process B program 1113, whether the IC card command is a file selecting command (command for selecting the digital certificate to be accessed) or not is discriminated (4103). If YES, a certificate file indicated by an ID (IDentification) number which is inputted by such a command is searched from the file (or from a plurality of files) of the digital certificate 1302 in the flash memory chip 1301 by a program of the certificate management 1114 and the ID number of the found certificate file is set into a register (RAM is desirable) in the CPU 1111. If the certificate file cannot be found, a special number showing the failure in selection can be set (4104). Step 4113 follows and an IC card response including information showing a file selection result is formed. If the IC card command is not the file selecting command in step 4103, whether it is a file read command (command for reading out the digital certificate) or not is discriminated (4105). If YES, the digital certificate shown by the ID number set in the register is read out from the flash memory chip 1301 by the program of the certificate management 1114 (4106). Step 4113 follows and an IC card response including the read-out digital certificate is formed. If the IC card command is not the file read command in step 4105, whether it is a file updating command (command for updating the digital certificate) or not is discriminated (4107). If YES, whether "authenticated" has been set in the PIN authentication register B 1105 or not is discriminated (4108). If "authenticated" has been set, the update data inputted together with this command is overwritten into the file area on the flash memory chip 1301 occupied by the digital certificate shown by the ID number set in the register by the program of the certificate management 1114. If a size of update data is larger than a size of such a file area, or the like, the data is not updated (4109). If "authenticated" is not set in step 4108, step 4109 is not executed. Step 4113 follows and an IC card response including information showing whether the update is successful or not is formed. If the IC card command is not the file updating command in step 4107, whether it is a random number generating command or not is discriminated (4110). If YES, whether "authenticated" has been set in the PIN authentication register B 1105 or not is discriminated (4111). If "authenticated" has been set, the pseudo random numbers are generated by a program of the pseudo random number generation 1115 by using the random number seed 1303 in the flash memory chip 1301 (4112). If "authenticated" is not set, step 4112 is not executed. Step 4113 follows and an IC card response including the generated random number data or information showing whether the generation is successful or not is formed. If the IC card command is not the random number generating command in step 4110, step 4113 follows and IC card response including information showing that the command could not be interpreted is formed. In this manner, the security process B program 1113 is completed. For the purpose of protecting the data, the digital certificate 1302 can be also stored into the flash memory chip 1301 in a state where the data has been encrypted or a signature has been added to the data. In this case, decryption of the certificate and verification of the signature are also executed in step 4106 and creation of the signature and cryptography of the certificate are also executed in step 4109.

Figure 5:
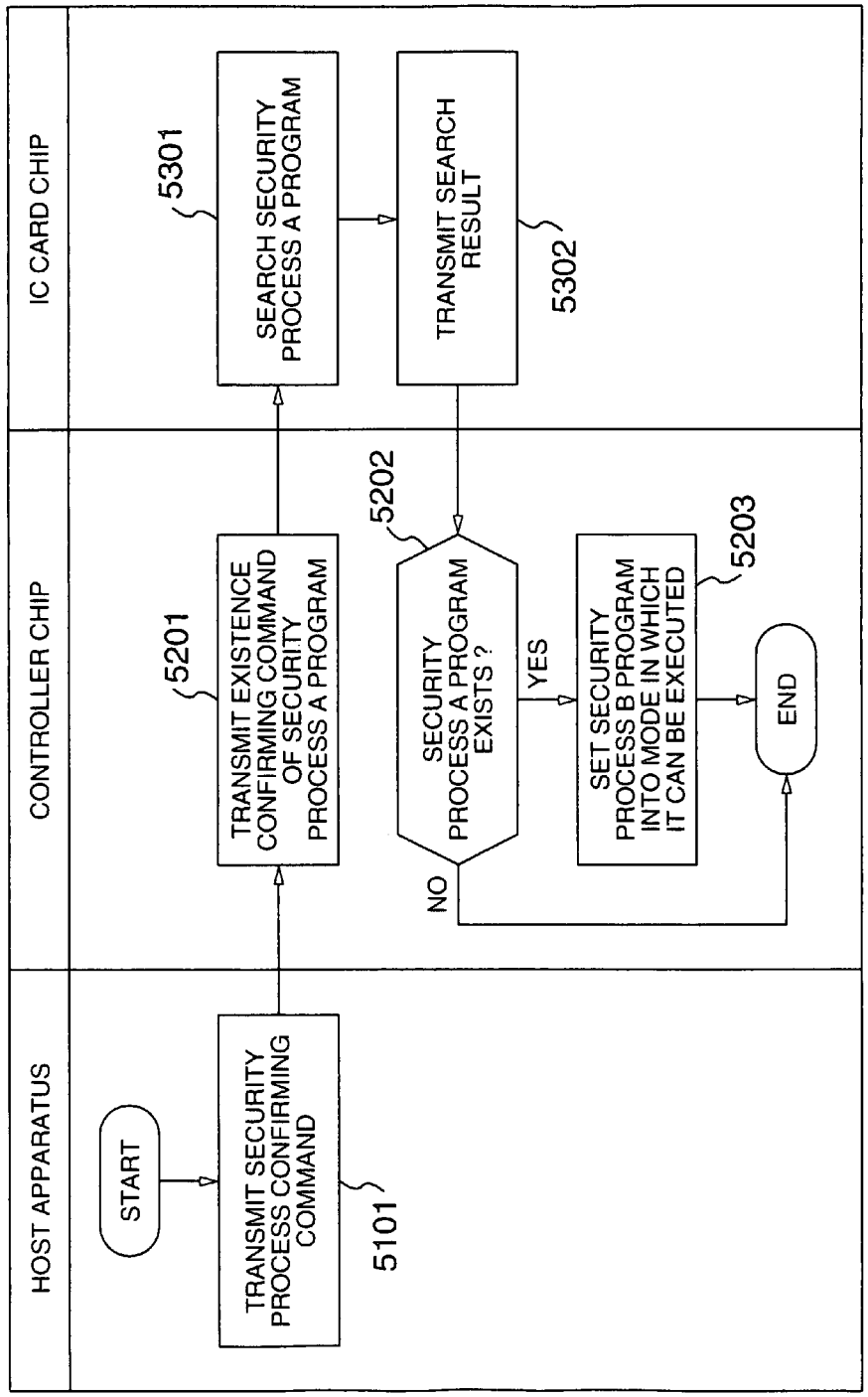
FIG. 5 is a flowchart showing a process for confirming whether the security processes in FIG. 2 can operate or not.

Subsequently, functions which the memory card 1001 to which the invention is applied has in order to improve the stability upon execution of the security processes will be explained. As will be obviously understood from the above explanation, the security processes are normally executed only when the security process A program (1212) and the security process B program (1113) existing in the two chips cooperate. Therefore, if the security process A program 1212 does not exist in the IC card chip 1201 due to some cause (for example, destruction or the like of the storage data due to deterioration of the EEPROM 1211), the security processes are not normally executed. FIG. 5 is a flowchart showing processes which are executed by the memory card 1001 in order to improve the execution stability of the security processes so as to cope with such a problem. The memory card 1001 has a function for interpreting a command called "security process confirming command". The security process confirming command is a command for allowing the memory card 1001 to previously confirm whether the security processes can operate normally or not. The IC card chip 1201 has a function for interpreting a command called "program existence confirming command". Processing steps of the "security process confirming command" will be described in detail in accordance with the flowchart of FIG. 5. First, the host apparatus 1401 transmits the "security process confirming command" (5101). The controller chip 1101 receives such a command and transmits the "program existence confirming command" to the IC card chip 1201 (5201). Thus, the IC card chip 1201 searches whether the security process A program exists in the EEPROM 1211 or not and if such a program is found, the program is set into a mode in which it can be used (5301). Subsequently, a search result (existence or absence) is transmitted as an IC card response to the controller chip 1101 (5302). The controller chip 1101 knows the existence of the security process A program 1212 from the received IC card response (5202). If the security process A program 1212 exists, the security process B program 1113 is set into a mode in which it can be executed (5203). If the security process A program 1212 does not exist, the process in step 5203 is not executed. By the above processes, the execution stability of the security processes is improved.

Figure 6:
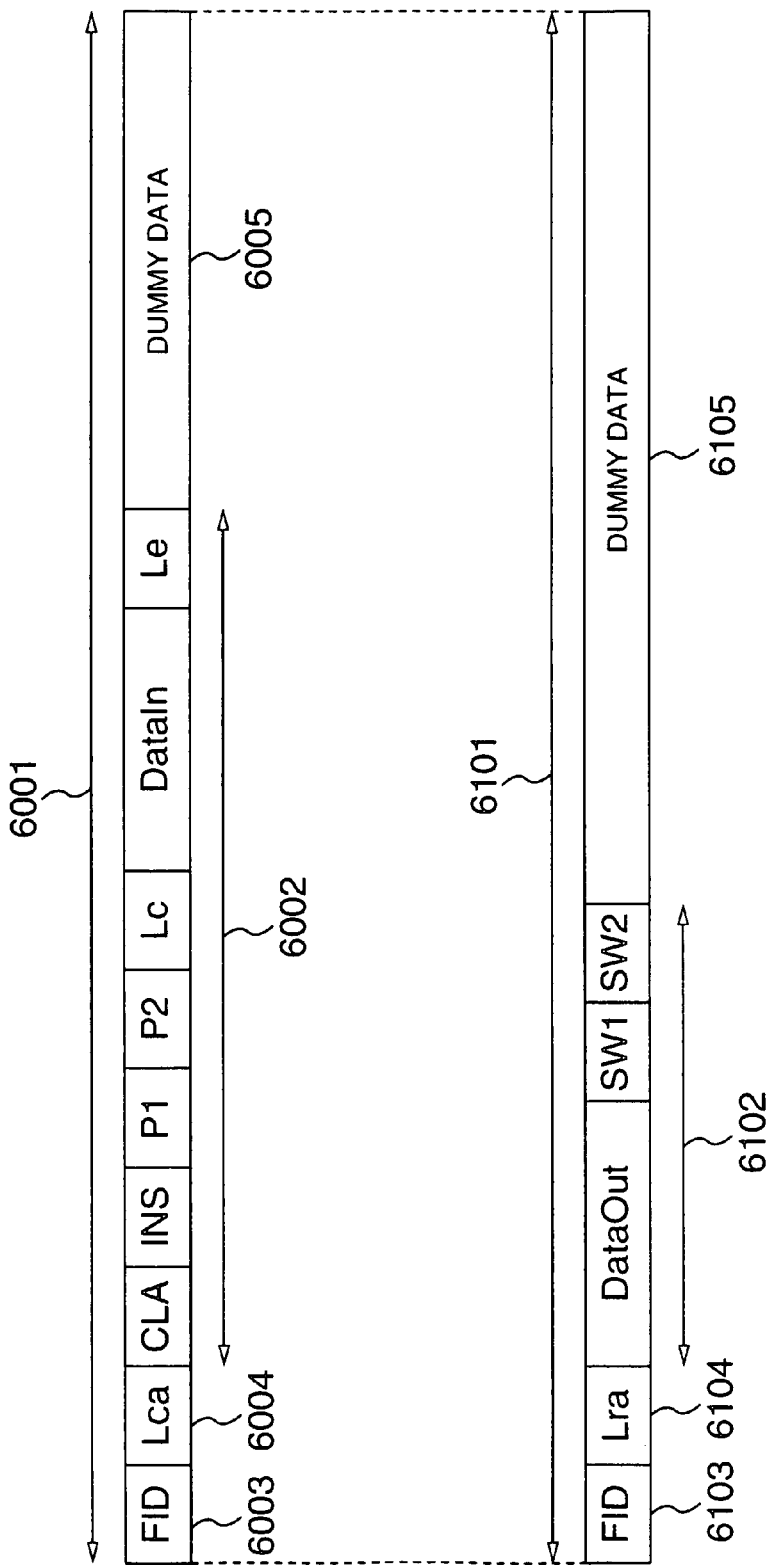
FIG. 6 is a diagram showing an example of formats of secure write data and secure read data.

FIG. 6 shows an example of a format of each of the secure write data which is transmitted to the memory card 1001 in step 2102 in FIG. 2 and the secure read data which is received by the host apparatus 1401 in step 2104. It is preferable to apply those formats to the case where the contents of the requested security processes can be expressed by one IC card command and results of the security processes can be expressed by one IC card response. As mentioned above, both of the IC card command which is transmitted to the IC card chip 1201 and the IC card response which is received from the IC card chip 1201 conform with the ISO/IEC7816-4 standard. According to this standard, in the construction of the IC card command, a header of 4 bytes (a class byte CLA, an instruction byte INS, and parameter bytes P1 and P2) are indispensable and an input data length indication byte Lc, input data DataIn, and an output data length indication byte Le follow as necessary. In the construction of the IC card response, statuses SW1 and SW2 of 2 bytes are indispensable and output data DataOut is followed by them as necessary. Secure write data 6001 in the format is constructed in a manner such that a format identifier FID 6003 and an IC card command length Lca 6004 are followed by an IC card command 6002 and, further, dummy data 6005 is padded after the IC card command 6002. The FID 6003 includes an identification number of the format or attribute data of the format. A value of the Lca 6004 is equal to a value obtained by summing lengths of component elements of the IC card command 6002. Secure read data 6101 is constructed in a manner such that a format identifier FID 6103 and an IC card response length Lra 6104 are followed by an IC card response 6102 and, further, dummy data 6105 is padded after the IC card response 6102. The FID 6103 includes an identification number of the format or attribute data of the format. A value of the Lra 6104 is equal to a value obtained by summing lengths of component elements of the IC card response 6102. The diagram shows the examples of the formats in the case where Lc, DataIn, and Le are included in the IC card command and DataOut is included in the IC card response. In many memory cards, according to the specification of the read/write command of the file data, it is a standard manner that the data to be read/write accessed is processed on a unit basis of a block of a fixed length. Therefore, it is preferable that a size of each of the secure write data 6001 and the secure read data 6101 is made to coincide with a block size according to the specification of the standard memory card command of the memory card 1001. The dummy data 6005 and 6105 is applied to make the size of each of the secure write data 6001 and the secure read data 6101 coincide with the block size. It is desirable that a sector size (512 bytes) in the FAT system which a general small memory card uses in a logical file system is used as a value which is used as a block size. The dummy data 6005 and 6105 to be padded can be set to all 0, random numbers, or a checksum which is used for the CPU 1111 or the host apparatus 1401 to detect or correct data errors. The value of the Lca 6004 is used for the CPU 1111 to remove the dummy data 6005 from the secure write data 6001. The value of the Lra 6104 is used for the host apparatus 1401 to remove the dummy data 6105 from the secure read data 6101.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A memory system capable of connecting to a host apparatus, said memory system comprising:
    a flash memory;
    an IC unit;
    a controller; and
    an external terminal for connecting to said host apparatus capable of communicating with a server,
    wherein said flash memory stores a digital certificate necessary for authenticating said host apparatus and a seed of random numbers for producing a key for encrypting communications between said server and said host apparatus,
    wherein said IC unit comprises a first program, an EEPROM storing a private key corresponding to said digital certificate and reference personal identification information, a first CPU capable of executing said first program, a cryptography coprocessor for producing a signature by use of said private key, and a first register,
    wherein said controller comprises a second CPU which can generate said random numbers in shorter time than said first CPU does and is capable of executing a second program, a second register, a first interface for connecting to said external terminal, a second interface for connecting to said flash memory, a third interface for connecting to said IC unit,
    wherein when said controller received a personal identification information from said host apparatus via said external terminal, said controller sends said personal identification information to said IC unit,
    wherein when said IC unit received said personal identification information from said controller, said IC unit authenticates said personal identification information by use of said reference personal identification information in accordance with said first program, and stores an authentication result of said personal identification information in said first register and sends the authentication result to said controller,
    wherein when said controller received the authentication result from said IC unit, said controller stores said authentication result in said second register in accordance with said second program,
    wherein when said IC unit received a request of producing a signature from said host apparatus via said external terminal and said controller, said IC unit refers said authentication result stored in said first register,
    wherein if said authentication result indicates the authentication successful, said IC unit produces the signature by use of said cryptography coprocessor and sends said signature to said host apparatus,
    wherein if said authentication result indicates a failure of the authentication, said IC unit refuses to produce the signature,
    wherein when said controller receives a request of generating the random numbers from said host apparatus via said external terminal, said controller refers said authentication result stored in said second register,
    wherein if said resultant indicates the authentication successful, said controller reads out said seed of random numbers from said flash memory, generates the random numbers based on said seed of random numbers in accordance with said second program and send said random numbers to said host apparatus, and
    wherein if said resultant indicates a failure of the authentication, said controller refuses to generate the random numbers.

2. The memory system according to claim 1,
    wherein said IC units encrypts the authentication result of said personal identification information by using a common key and outputs the encrypted authentication result of said personal identification information to said controller, and
    wherein said controller decrypts the encrypted authentication result of said personal identification information by using said common key and stores the decrypted authentication result of said personal identification information in said second register.

3. The memory system according to claim 1, wherein said first and second registers abandon said authentication result stored in said first and second registers when a supply of a power source to said controller is stopped.

4. The memory system according to claim 1, wherein said controller reads out said digital certificate from said flash memory and sends out digital certificate to said host apparatus.

5. The memory system according to claim 1, wherein said controller converts a command received from said host apparatus via said external terminal into a command which can be interpreted by said UC unit and outputs the converted command to said IC unit.

6. The memory system according to claim 1, wherein said controller and said IC unit are separate chips.

7. The memory system according to claim 1, wherein said controller supplies electric power to said IC unit.

8. The memory system according to claim 1, wherein said controller generates a clock signal independent from a clock signal inputted from said host apparatus via said external terminal.

9. The memory system according to claim 1, wherein said controller generates, in response to a request from said host apparatus via said external terminal, said random numbers each time when a communication between said server and said host apparatus is established.

* * * * *